No. 686,731. Patented Nov. 19, 1901.
H. HEMPEL.
APPARATUS FOR HEATING CURLING TONGS.
(Application filed Dec. 7, 1900.)
(No Model.)

Witnesses:

Inventor:
Heinrich Hempel
by Eustace W Hopkins
Atty.

United States Patent Office.

HEINRICH HEMPEL, OF BERLIN, GERMANY.

APPARATUS FOR HEATING CURLING-TONGS.

SPECIFICATION forming part of Letters Patent No. 686,731, dated November 19, 1901.

Application filed December 7, 1900. Serial No. 39,046. (No model.)

*To all whom it may concern:*

Be it known that I, HEINRICH HEMPEL, a subject of the Emperor of Germany, residing at Berlin, Germany, have invented certain new and useful Improved Apparatus for Heating Curling-Tongs, of which the following is a full, clear, and exact description.

The present invention comprises an apparatus for heating curling-tongs, the same being conveniently packed, and solidified spirits being the heating medium.

In order to render the present specification easily intelligible, reference is had to the accompanying drawings, in which similar letters of reference denote similar parts throughout the several views.

Figure 1:
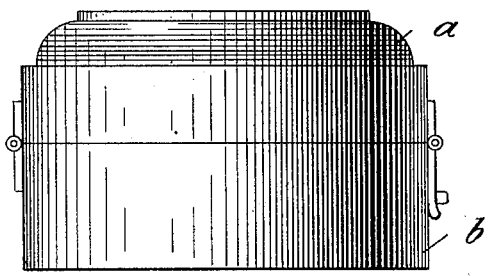
Figure 2:
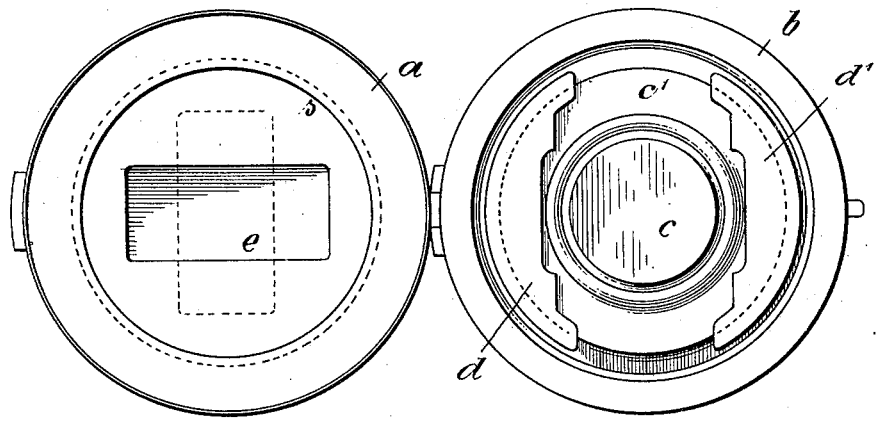

Figure 1 is a side elevation of the apparatus when packed; Fig. 2, a plan of the same when opened, and Fig. 3 a vertical section through the same when in operation.

The casing consists of the two parts $a$ and $b$, hinged together. The part $a$ contains an elongated well $e$, mounted on a plate $s$ to rotate in a horizontal partition-wall, said well forming the receptacle in which the spirits may be burned. The part $b$ serves as a receptacle for the spirits, which are in solid form and advantageously in the shape of cubes $f$, as will be seen from Fig. 3. The interior surface of the part $b$ is closed by a plate $c'$, provided with a cover $c$, screwed into the same, and on the exterior side of the closing-plate brackets $d\,d'$ are hinged, which may be turned upwardly into the position shown in Fig. 3 and serve to hold the curling-tongs.

Figure 3:
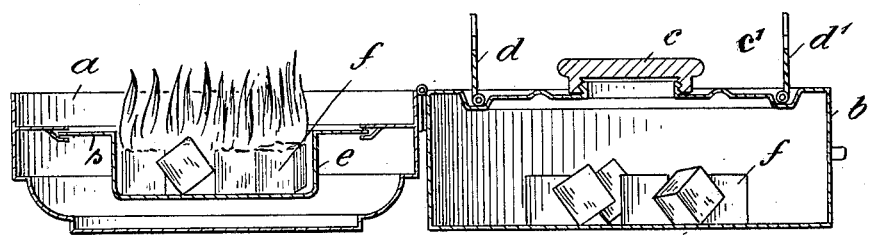

The manipulation of the apparatus is very simple. When it is to be used, the cover $a$ is thrown back, as illustrated in Fig. 3, several cubes of the solidified spirits are placed in the well $e$ and ignited, the brackets $d\,d'$ are turned upward, and the tongs placed on the same.

The well $e$ is advantageously of elongated form, and the object in making it rotatable is to enable its employment for narrow or broad tongs. Thus if very narrow tongs are employed the well is turned so that its longitudinal axis will be parallel to the direction of the shanks of the tongs, but if broad tongs are to be heated the well may be turned into the position indicated in dotted lines in Fig. 2.

I claim as my invention—

1. The combination of a receptacle, a cover hinged thereto, a well mounted to rotate in the said cover in a horizontal plane said well being of an elongated shape and serving as a receptacle for the spirits to be burned, when the cover is thrown back substantially as described.

2. The combination of a receptacle $b$ having a plate to close up the same, a cover hinged to said receptacle having an elongated well rotatably mounted therein as specified, and means in connection with the receptacle $b$ for supporting the curling-tongs in the manner and for the purpose substantially as described.

3. The combination of a receptacle $b$ having a plate to close the same and a screw-cap therein, a cover $a$ hinged thereto and having a well therein of elongated form said well being rotatably mounted in a horizontal plane in the said cover, brackets hinged to the upper side of the plate closing the receptacle $b$ in the manner and for the purpose substantially as described.

In witness whereof I have hereunto set my hand in presence of two witnesses.

HEINRICH HEMPEL.

Witnesses:
 HENRY HASPER,
 WOLDEMAR HAUPT.